(12) United States Patent
Tsujii

(10) Patent No.: US 10,291,167 B2
(45) Date of Patent: May 14, 2019

(54) DRIVE SYSTEM AND CONTROL METHOD FOR DRIVE SYSTEM

(71) Applicant: TOYOTA JIDOSHA KABUSHIKI KAISHA, Toyota-shi, Aichi-ken (JP)

(72) Inventor: Shintaro Tsujii, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/794,447

(22) Filed: Oct. 26, 2017

(65) Prior Publication Data

US 2018/0175776 A1    Jun. 21, 2018

(30) Foreign Application Priority Data

Dec. 20, 2016    (JP) ................. 2016-246685

(51) Int. Cl.

| | |
|---|---|
| *H02P 1/00* | (2006.01) |
| *H02P 27/08* | (2006.01) |
| *H02M 7/5395* | (2006.01) |
| *B60L 15/00* | (2006.01) |
| *B60L 15/02* | (2006.01) |
| *B60L 15/20* | (2006.01) |
| *H02M 3/158* | (2006.01) |
| *B60L 11/18* | (2006.01) |
| *H02M 1/00* | (2006.01) |

(52) U.S. Cl.
CPC ............ *H02P 27/08* (2013.01); *B60L 15/007* (2013.01); *B60L 15/02* (2013.01); *B60L 15/2045* (2013.01); *H02M 7/5395* (2013.01); *B60L 11/1803* (2013.01); *B60L 2210/14* (2013.01); *B60L 2210/40* (2013.01); *H02M 3/158* (2013.01); *H02M 2001/007* (2013.01); *H02P 2201/07* (2013.01)

(58) Field of Classification Search
CPC ..... H02M 7/5395; H02M 3/158; H02P 27/08; B60L 2210/14
See application file for complete search history.

(56) References Cited

U.S. PATENT DOCUMENTS

2006/0076914 A1* 4/2006 Yaguchi ............... H02P 25/098
318/432

FOREIGN PATENT DOCUMENTS

| JP | 2010-252488 | 11/2010 |
|---|---|---|
| JP | 2014-117118 | 6/2014 |

* cited by examiner

*Primary Examiner* — Karen Masih
(74) *Attorney, Agent, or Firm* — Finnegan, Henderson, Farabow, Garrett & Dunner, LLP

(57) ABSTRACT

A controller is configured to, while the step-up converter is being controlled in a state where a duty ratio of an on state of an upper arm that is any one of the two switching elements is set to 100% such that the step-up converter does not perform a step-up operation, when a modulation factor of the inverter in voltage modulation exceeds a predetermined modulation factor lower than a step-up command issuance modulation factor at which a step-up command is issued to the step-up converter or when a target voltage at the side of the inverter based on a target operating point of the electric motor exceeds a predetermined voltage lower than the voltage at the side of the electrical storage device, reduce the duty ratio of the on state of the upper arm from 100%.

10 Claims, 7 Drawing Sheets

(a) NON-STEP-UP STATE (Duty = 100%)

(b) NON-STEP-UP STATE IS CANCELLED
(UPPER ARM OFF TIME IS SHORTER THAN OR EQUAL TO DEAD TIME)

(c) STEP-UP STATE (UPPER ARM OFF TIME IS LONGER THAN DEAD TIME)

DRIVE SYSTEM AND CONTROL METHOD FOR DRIVE SYSTEM

INCORPORATION BY REFERENCE

The disclosure of Japanese Patent Application No. 2016-246685 filed on Dec. 20, 2016 including the specification, drawings and abstract is incorporated herein by reference in its entirety.

BACKGROUND

1. Technical Field

The disclosure relates to a drive system and a control method for a drive system and, more particularly, to a drive system including an electrical storage device, an electric motor, an inverter, a capacitor, a step-up converter and a controller, and a control method for a drive system.

2. Description of Related Art

Conventionally, there is known a drive system of this type. The drive system includes a step-up converter that adjusts an inverter-side voltage for driving a motor to a voltage higher than or equal to a battery-side voltage. For example, Japanese Patent Application Publication No. 2014-117118 (JP 2014-117118 A) describes a drive system. The drive system executes a non-step-up mode when the modulation factor of an inverter is lower than a non-step-up threshold, and executes a step-up mode when the modulation factor becomes higher than a step-up threshold. In the non-step-up mode, the step-up ratio of a step-up converter is set to a value of 1.0. In the step-up mode, the step-up ratio of the step-up converter is set so as to be higher than a value of 1.0.

SUMMARY

With the above-described drive system, ordinarily, in order to avoid simultaneous on states of two switching elements of the step-up converter, a dead time is provided. Therefore, even when the step-up ratio of the step-up converter is tried to be set so as to be higher than a value of 1.0 at the timing at which the modulation factor becomes higher than the step-up threshold, there can be a delay from an actual start of a step-up operation, and the controllability of the motor can deteriorate.

The disclosure provides a drive system and a control method for a drive system, which reduce a delay in response at the time when a step-up converter is shifted from a non-step-up state to a step-up state.

An aspect of the disclosure provides a drive system including the following components.

The drive system includes an electrical storage device, an electric motor, an inverter, a step-up converter and a controller. The inverter is configured to drive the electric motor through voltage modulation. The step-up converter includes two switching elements and a reactor. The step-up converter is configured to adjust a voltage at a side of the inverter to a voltage higher than or equal to a voltage at a side of the electrical storage device. The controller is configured to, while the step-up converter is being controlled in a state where a duty ratio of an on state of an upper arm that is any one of the two switching elements is set to 100% such that the step-up converter does not perform a step-up operation, when a modulation factor of the inverter in voltage modulation exceeds a predetermined modulation factor lower than a step-up command issuance modulation factor at which a step-up command is issued to the step-up converter or when a target voltage at the side of the inverter based on a target operating point of the electric motor exceeds a predetermined voltage lower than the voltage at the side of the electrical storage device, reduce the duty ratio of the on state of the upper arm from 100%.

In the drive system according to the aspect of the disclosure, when it is not required to cause the step-up converter to perform a step-up operation, the step-up converter is controlled in a state where the duty ratio of the on state of the upper arm that is any one of the two switching elements of the step-up converter is set to 100%. During then, when the modulation factor of the inverter in voltage modulation exceeds the predetermined modulation factor lower than the step-up command issuance modulation factor or when the target voltage at the side of the inverter based on the target operating point of the electric motor exceeds a predetermined voltage lower than the voltage at the side of the electrical storage device, the duty ratio of the on state of the upper arm is reduced from 100%. Thus, in comparison with the case where the duty ratio of the on state of the upper arm is reduced from 100% when the modulation factor exceeds the step-up command issuance modulation factor or when the target voltage at the side of the inverter exceeds the voltage at the side of the electrical storage device, it is possible to reduce a delay in response at the time when the step-up converter is shifted from the non-step-up state to the step-up state.

In the drive system according to the aspect of the disclosure, the controller may be configured to, when the modulation factor exceeds the predetermined modulation factor or when the target voltage at the side of the inverter exceeds the predetermined voltage, reduce the duty ratio of the on state of the upper arm from 100% within a range in which an off time of the upper arm does not exceed a dead time caused by an off state of the upper arm. With this configuration, the lower arm is not turned on even when the upper arm is turned off, so it is possible to substantially keep the duty ratio of the on state of the upper arm at 100%. Therefore, in a situation in which the modulation factor does not exceed the step-up command issuance modulation factor or the target voltage at the side of the inverter does not exceed the voltage at the side of the electrical storage device, it is possible to reduce a step-up operation of the step-up converter.

In the drive system according to the aspect of the disclosure, the controller may be configured to, when the modulation factor exceeds the step-up command issuance modulation factor or when the target voltage at the side of the inverter exceeds the voltage at the side of the electrical storage device, further reduce the duty ratio of the on state of the upper arm. With this configuration, it is possible to cause the voltage at the side of the inverter to quickly follow the target voltage.

In the drive system according to the aspect of the disclosure, the controller may be configured to change the predetermined modulation factor in response to a state of change in the modulation factor. Alternatively, the controller may be configured to change the predetermined voltage in response to a state of change in the target voltage. With this configuration, it is possible to further reliably reduce the duty ratio of the on state of the upper arm from 100% at the timing just before the modulation factor exceeds the step-up command issuance modulation factor or at the timing just before the target voltage exceeds the voltage at the side of the electrical storage device.

Another aspect of the disclosure provides a control method for a drive system. The drive system includes an electrical storage device, an electric motor, an inverter and a step-up converter. The inverter is configured to drive the electric motor through voltage modulation. The step-up converter includes two switching elements and a reactor. The step-up converter is configured to adjust a voltage at a side of the inverter to a voltage higher than or equal to a voltage at a side of the electrical storage device. The control method includes, while the step-up converter is being controlled in a state where a duty ratio of an on state of an upper arm that is any one of the two switching elements is set to 100% such that the step-up converter does not perform a step-up operation, when a modulation factor of the inverter in voltage modulation exceeds a predetermined modulation factor lower than a step-up command issuance modulation factor at which a step-up command is issued to the step-up converter or when a target voltage at the side of the inverter based on a target operating point of the electric motor exceeds a predetermined voltage lower than the voltage at the side of the electrical storage device, reducing the duty ratio of the on state of the upper arm from 100%.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
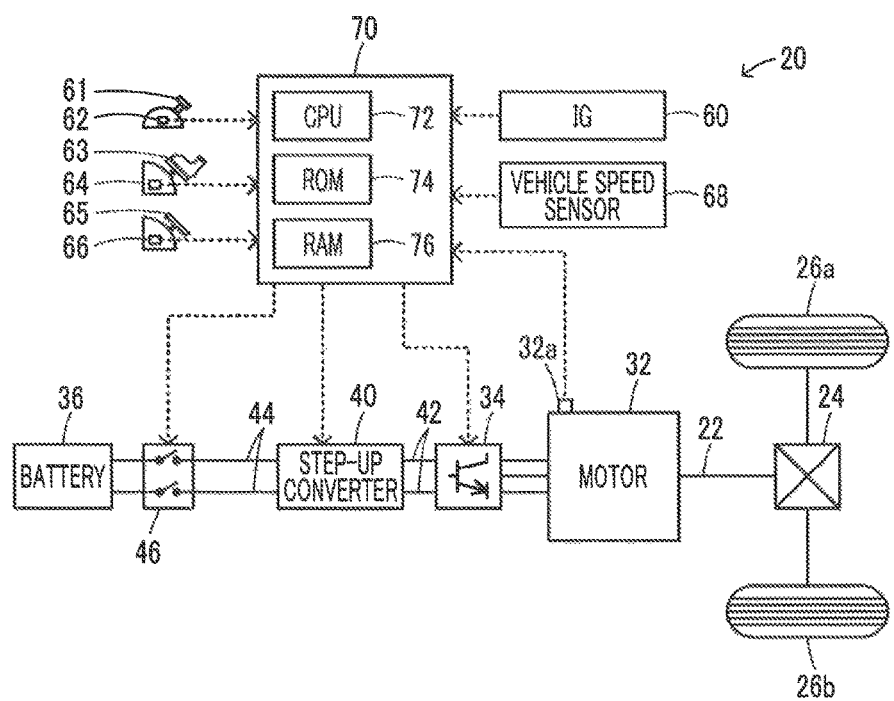
FIG. 1 is a block diagram that schematically shows the configuration of an automobile on which a drive system according to an embodiment of the disclosure is mounted.
Figure 2:
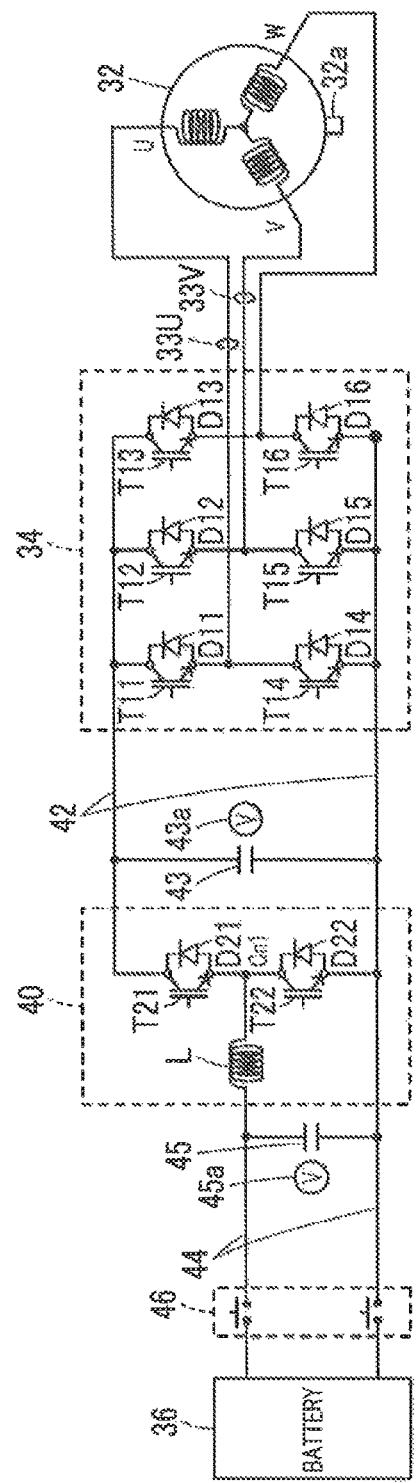
FIG. 2 is a block diagram of an electrical drive system including a motor, an inverter and a step-up converter.

An embodiment of the disclosure will be described below.
FIG. 1 is a block diagram that schematically shows the configuration of an automobile 20 on which a drive system according to the embodiment of the disclosure is mounted. FIG. 2 is a block diagram of an electrical drive system including a motor 32, an inverter 34 and a step-up converter 40. As shown in FIG. 1, the automobile 20 according to the embodiment includes the motor 32, the inverter 34, a battery 36, the step-up converter 40 and an electronic control unit 70.

The motor 32 is a synchronous generator-motor including a rotor and a stator. Permanent magnets are embedded in the rotor. Three-phase coils are wound in the stator. The rotor of the motor 32 is connected to a drive shaft 22. The drive shaft 22 is coupled to drive wheels 26a, 26b via a differential gear 24.

The inverter 34 is connected to the motor 32 and a high-voltage power line 42. As shown in FIG. 2, the inverter 34 includes six transistors T11 to 116 and six diodes D11 to D16. The transistors T11 to T16 are arranged in pairs such that the two transistors of each pair are respectively placed at a source side and at a sink side with respect to the positive bus line and negative bus line of the high-voltage power line 42. The six diodes D11 to D16 are respectively connected in anti-parallel with the transistors T11 to T16. Each of the three-phase coils (U-phase, V-phase and W-phase coils) of the motor 32 is connected to a corresponding one of connection points of the pairs of transistors T11 to T16. Therefore, when the electronic control unit 70 adjusts the ratio (duty ratio) of the on time of each of the pairs of transistors T11 to T16 while a voltage is applied to the inverter 34, rotating magnetic fields are formed around the three-phase coils, with the result that the motor 32 is driven to rotate. A smoothing capacitor 43 is connected to the positive bus line and negative bus line of the high-voltage power line 42.

The step-up converter 40 is connected to the high-voltage power line 42 and a battery-voltage power line 44. The inverter 34 is connected to the high-voltage power line 42. The battery 36 is connected to the battery-voltage power line 44 via a system main relay 46. The step-up converter 40 includes two transistors T21, T22, two diodes D21, D22 and a reactor L. The transistor T21 is connected to the positive bus line of the high-voltage power line 42. The transistor T22 is connected to the transistor T21 and the negative bus line of each of the high-voltage power line 42 and the battery-voltage power line 44. The two diodes D21, D22 are respectively connected in anti-parallel with the transistors T21, T22. The reactor L is connected to a connection point Cn1 and the positive bus line of the battery-voltage power line 44. The connection point Cn1 is a point at which the transistors T21, 122 are connected to each other. When the electronic control unit 70 adjusts the ratio (duty ratio) of the on time of each of the transistors T21, T22, the step-up converter 40 steps up the electric power of the battery-voltage power line 44 and supplies the stepped-up electric power to the high-voltage power line 42 or steps down the electric power of the high-voltage power line 42 and supplies the stepped-down electric power to the battery-voltage power line 44. A smoothing capacitor 45 is connected to the positive bus line and negative bus line of the battery-voltage power line 44.

The battery 36 is a nickel metal-hydride secondary battery or a lithium-ion secondary battery. As described above, the battery 36 is connected to the battery-voltage power line 44 via the system main relay 46.

The electronic control unit 70 is a microprocessor mainly including a CPU 72. The electronic control unit 70 includes a ROM 74, a RAM 76 and input/output ports (not shown) in addition to the CPU 72. The ROM 74 stores processing programs. The RAM 76 temporarily stores data. A rotational position of the rotor of the motor 32, phase currents, a terminal voltage, a charge/discharge current, a battery temperature, a capacitor voltage (the voltage of the high-voltage power line 42; hereinafter, referred to as high-voltage-line voltage) VH, a capacitor voltage (the voltage of the battery-voltage power line 44; hereinafter, referred to as battery-voltage-line voltage) VL, and the like, are input to the electronic control unit 70 via the input port. The rotational position of the rotor of the motor 32 is supplied from a rotational position detection sensor 32a. The rotational position detection sensor 32a detects the rotational position of the rotor of the motor 32. The phase currents are respectively supplied from current sensors 33U, 33V. The current sensors 33U, 33V are attached to the corresponding phase coils of the motor 32. The terminal voltage is supplied from a voltage sensor (not shown). The voltage sensor is installed between the terminals of the battery 36. The charge/discharge current is supplied from a current sensor (not shown). The current sensor is connected to the output terminal of the battery 36. The battery temperature is supplied from a temperature sensor (not shown). The temperature sensor is attached to the battery 36. The capacitor voltage VH is supplied from a voltage sensor 43a. The voltage sensor 43a is attached between the terminals of the capacitor 43. The capacitor voltage VL is supplied from a voltage sensor 45a. The voltage sensor 45a is attached between the terminals of the capacitor 45. An ignition signal, a shift position SP, an accelerator operation amount Acc, a brake pedal position BP, a vehicle speed V and the like, are also input to the electronic control unit 70 via the input port. The ignition signal is supplied from an ignition switch 60. The shift position SP is supplied from a shift position sensor 62. The shift position sensor 62 detects the operating position of a shift lever 61. The accelerator operation amount Acc is supplied from an accelerator pedal position sensor 64. The accelerator pedal position sensor 64 detects the depression amount of an accelerator pedal 63. The brake pedal position BP is supplied from a brake pedal position sensor 66. The brake pedal position sensor 66 detects the depression amount of a brake pedal 65. The vehicle speed V is supplied from a vehicle speed sensor 68. On the other hand, switching control signals to the transistors T11 to T16 of the inverter 34, switching control signals to the transistors T21, T22 of the step-up converter 40, a driving signal to the system main relay 46, and the like, are output from the electronic control unit 70 via the output port. The electronic control unit 70 also computes the rotation speed Nm of the motor 32 on the basis of the rotational position of the rotor of the motor 32 from the rotational position detection sensor 32a.

The drive system according to the embodiment corresponds to the motor 32, the inverter 34, the battery 36, the step-up converter 40 and the electronic control unit 70.

In the automobile 20 on which the thus configured drive system according to the embodiment is mounted, a required torque Tr* that is required for traveling is set on the basis of the accelerator operation amount Ace and the vehicle speed V, a torque command Tm* of the motor 32 is set such that the required torque Tr* is output to the drive shaft 22, and the transistors T11 to T16 of the inverter 34 undergo switching control.

The details of control over the inverter 34 will be described. The inverter 34 is controlled by using any one of three control modes, that is, a sinusoidal wave pulse width modulation (PWM) control mode, an overmodulation PWM control mode and a rectangular wave control mode. The sinusoidal wave PWM control mode is a control mode in which an output voltage having a sinusoidal fundamental wave component is obtained by turning on or off the transistors T11 to T16 of the inverter 34 on the basis of a comparison between a sinusoidal wave voltage command value and the magnitude of a carrier wave, such as a triangular wave. In the sinusoidal wave PWM control mode, a modulation factor Km falls within a range of a value of 0 to substantially a value of 0.61 (this upper limit value is referred to as sinusoidal limit modulation factor). The modulation factor Km is the ratio of the amplitude of the sinusoidal output voltage to the high-voltage-line voltage VH. The sinusoidal wave PWM control mode allows to increase the modulation factor Km to substantially a value of 0.7 (sinusoidal limit modulation factor) by superimposing the 3n-order harmonic on a sinusoidal voltage command. The overmodulation PWM control mode is a mode in which an output voltage having a distorted fundamental wave component is obtained by expanding the amplitude of the sinusoidal voltage command beyond the amplitude of the carrier wave and then executing control similar to that of the above-described sinusoidal wave PWM control mode. In the overmodulation PWM control mode, the modulation factor Km falls within a range of substantially a value of 0.61 (or 0.7) to a value of 0.78 (this upper limit value is referred to as overmodulation limit modulation factor). The rectangular wave control mode is a control mode in which the inverter 34 is controlled such that the phase of a rectangular voltage having a constant amplitude varies in response to the torque command Tm*. In the rectangular wave control mode, the modulation factor Km is constant at substantially a value of 0.78.

In any one of the PWM control modes (the sinusoidal wave PWM control mode and the overmodulation PWM control mode), the CPU 72 of the electronic control unit 70 initially sets a d-axis current command Id* and a q-axis current command Iq* on the basis of the torque command Tm* of the motor 32. The CPU 72 further transforms the coordinates of the phase currents of the motor 32, which are detected by the current sensors 33U, 33V to the coordinates of d-axis and q-axis currents Id, Iq by using the electrical angle of the motor 32 based on the rotational position that is detected by the rotational position detection sensor 32a. Subsequently, the CPU 72 sets a d-axis voltage command Vd* on the basis of a deviation between the d-axis current command Id* and the current Id. Similarly, the CPU 72 sets a q-axis voltage command Vq* on the basis of a deviation between the q-axis current command Iq and the current Iq. After that, the CPU 72 transforms the coordinates of the set d-axis and q-axis voltage commands Vd*, Vq* to the coordinates of U-phase, V-phase and W-phase voltage commands Vu*, Vv*, Vw* by using the electrical angle of the motor 32. Then, the CPU 72 converts the U-phase, V-phase and W-phase voltage commands Vu*, Vv*, Vw* to PWM signals for switching the transistors T11 to T16 of the inverter 34, and causes the transistors T11 to T16 of the inverter 34 to undergo switching control by outputting the PWM signals to the inverter 34.

In the rectangular wave control mode, a voltage phase command θv* is set on the basis of the torque command Tm*, and a rectangular wave signal is generated such that a rectangular wave voltage based on the voltage phase command θv* is applied to the motor 32. The transistors T11 to T16 of the inverter 34 are subjected to switching control by outputting the rectangular wave signal to the inverter 34.

In the present embodiment, the control mode of the inverter 34 is set to any one of the sinusoidal wave PWM control mode, the overmodulation PWM control mode and the rectangular wave control mode by comparing the modulation factor Km with the sinusoidal limit modulation factor or the overmodulation limit modulation factor. Specifically, when the modulation factor Km is higher than or equal to a value of 0 and is lower than a value of 0.61 (or a value of 0.7) that is the sinusoidal limit modulation factor, the sinusoidal wave PWM control mode is set for the control mode. When the modulation factor Km is higher than or equal to a value of 0.61 (or a value of 0.7) and is lower than a value of 0.78 that is the overmodulation limit modulation factor, the overmodulation PWM control mode is set for the control mode. When the modulation factor Km is higher than or equal to a value of 0.78, the rectangular wave control mode is set for the control mode. The modulation factor Km is calculated by dividing the amplitude of a sinusoidal voltage command by the high-voltage-line voltage VH. The amplitude of a sinusoidal voltage command is calculated by finding the square root of the sum of the square of the voltage command Vd* and the square of the voltage command Vq*.

Figure 3:
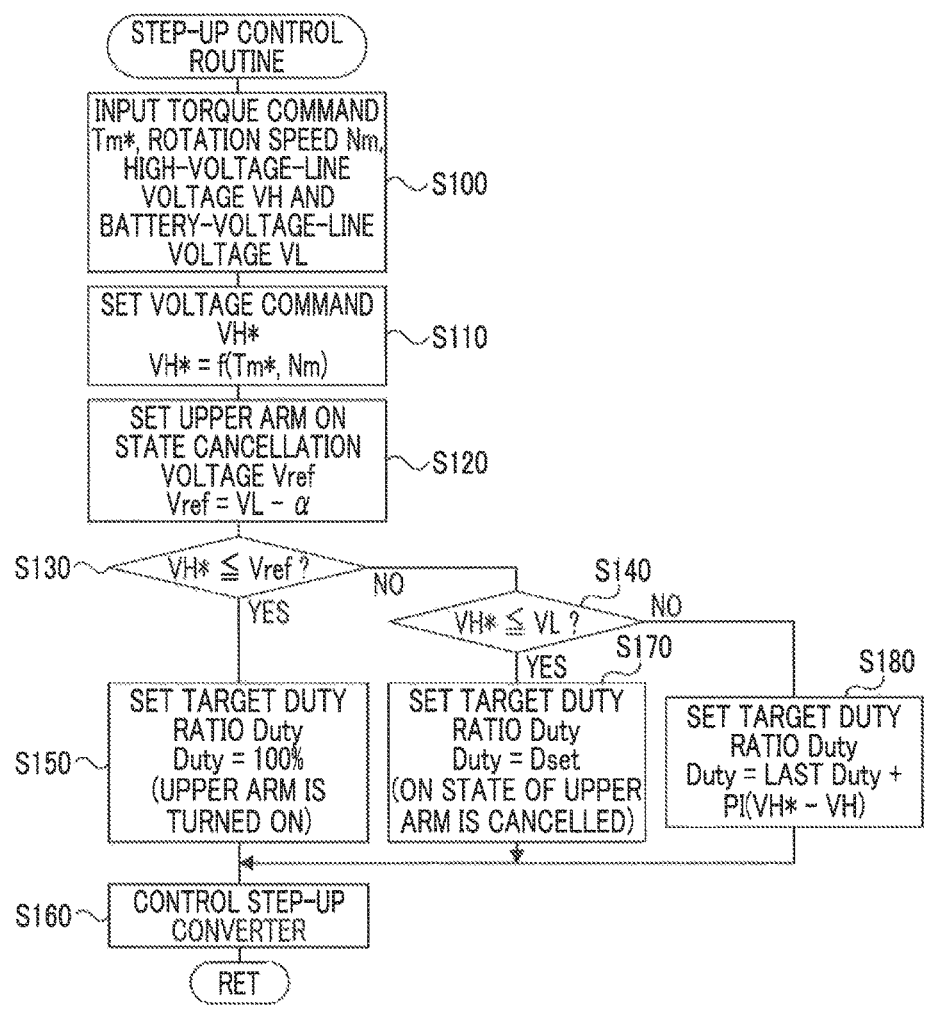
FIG. 3 is a flowchart that shows an example of a step-up control routine.

Next, control over the step-up converter 40 will be described. FIG. 3 is a flowchart that shows an example of a step-up control routine that is executed by the CPU 72 of the electronic control unit 70. This routine is repeatedly executed at predetermined time intervals (for example, at intervals of several milliseconds).

When the step-up control routine is executed, the CPU 72 of the electronic control unit 70 initially executes the process of inputting data that are required for control, such as the torque command TM* and rotation speed Nm of the motor 32, the high-voltage-line voltage VH and the battery-voltage-line voltage VL (step S100). As described above, the torque command Tm* set on the basis of the accelerator operation amount Ace and the vehicle speed V is input. The rotation speed Nm computed on the basis of the rotational position of the rotor of the motor 32 from the rotational position detection sensor 32a is input. The high-voltage-line voltage VH detected by the voltage sensor 43a and the battery-voltage-line voltage VL detected by the voltage sensor 45a are input.

When data are input in this way, the voltage command VH* of the high-voltage power line 42 (capacitor 43), which is required to drive the motor 32 at a target operating point composed of the input torque command TM* and the input rotation speed Nm, is set (step S110). Subsequently, an upper arm on state cancellation voltage Vref of the step-up converter 40 is set (step S120). The upper arm on state cancellation voltage Vref is a threshold for cancelling a state where the duty ratio of the on state of the transistor T21 that is the upper arm of the step-up converter 40 is set to 100% (upper arm is in the on state, and the step-up converter 40 is in the non-step-up state). For the voltage command VH*, the upper arm on state cancellation voltage Vref is set to a value obtained by subtracting a predetermined value α from the battery-voltage-line voltage VL at which a step-up command is issued. In the present embodiment, the predetermined value α is set to a larger value as a variation per unit time in the voltage command VH* increases. Of course, a constant value may be set for the predetermined value α. In this way, the upper arm on state cancellation voltage Vref is set to a value such that the on state of the upper arm is cancelled just before the step-up command is issued. Then, it is determined whether the voltage command VH* is lower than or equal to the upper arm on state cancellation voltage Vref (step S130), and it is determined whether the voltage command VH* is lower than or equal to the battery-voltage-line voltage VL (step S140). When it is determined that the voltage command VH* is lower than or equal to the upper arm on state cancellation voltage Vref, a target duty ratio Duty that is a target value of the duty ratio of the on state of the transistor T21 (upper arm) is set to 100% (step S150), and the transistors T21, T22 of the step-up converter 40 are subjected to switching control in accordance with the set target duty ratio Duty (step S160), after which the step-up control routine is ended. Thus, the step-up converter 40 is placed in the non-step-up state, the inverter 34 is controlled by using the battery-voltage-line voltage VL (the voltage of the battery 36), and the motor 32 is driven. Therefore, it is possible to improve efficiency by reducing a loss due to switching of the step-up converter 40.

When it is determined in step S130 and step S140 that the voltage command VH* is higher than the upper arm on state cancellation voltage Vref and is lower than or equal to the battery-voltage-line voltage VL, the target duty ratio Duty is set to a predetermined duty ratio Dset (step S170), and the step-up converter 40 is controlled in accordance with the set target duty ratio Duty (step S160), after which the step-up control routine is ended. The predetermined duty ratio Dset is set so as to be lower than 100% within the range in which the off time of the upper arm (transistor T21) does not exceed a dead time for avoiding simultaneous on states of the two transistors T21, T22. Specifically, the predetermined duty ratio Dset may be determined such that the off time of the upper arm substantially coincides with a dead time caused by the off state of the upper arm. For example, when the switching frequency of the step-up converter 40 is 10 kHz (the switching period is 0.1 msec) and the dead time is 5 μsec, the predetermined duty ratio Dset may be set to 95%. When the off time of the upper arm does not exceed a dead time caused by the off state of the upper arm, the lower arm is not turned on, so the step-up converter 40 does not step up voltage. That is, even when the target duty ratio Duty is set to the predetermined duty ratio Dset lower than 100% and the on state of the upper arm (non-step-up state) is cancelled, the substantial duty ratio of the step-up converter 40 remains 100%.

When it is determined in step S140 that the voltage command VH* is higher than the battery-voltage-line voltage VL, the target duty ratio Duty is further reduced as in the case where the on state of the upper arm is cancelled and is set by using the following mathematical expression (1) such that the high-voltage-line voltage VH becomes the voltage command VH* (step S180), and the step-up converter 40 is controlled in accordance with the set target duty ratio Duty (step S160), after which the step-up control routine is ended. The mathematical expression (1) is a relational expression in feedback control for bringing the high-voltage-line voltage VH into coincidence with the voltage command VH*. In the mathematical expression (1), k1 denotes a gain in the proportional term, and k2 denotes a gain in the integral term. The last Duty is a target duty ratio set in the last routine.

$$\text{Duty} = \text{Last Duty} + k1 \cdot (VH^* - VH) + k2 \cdot \int (VH^* - VH) dt \qquad (1)$$

Figure 4:
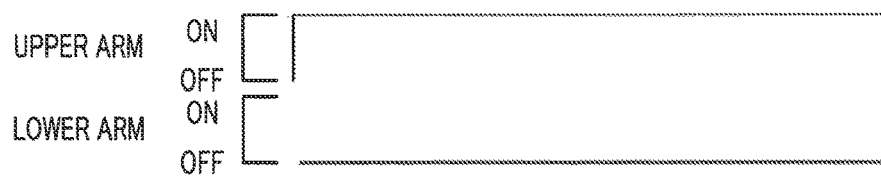
FIG. 4 is an explanatory diagram that shows the statuses of upper and lower arms in the case where the step-up converter is placed in a non-step-up state, in the case where the non-step-up state is cancelled and in the case where the step-up converter is placed in a step-up state.
Figure 4:
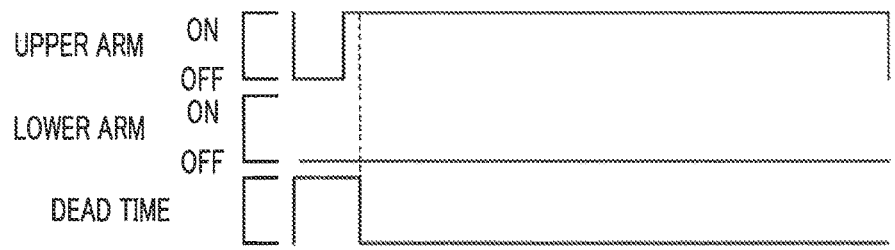
Figure 4:
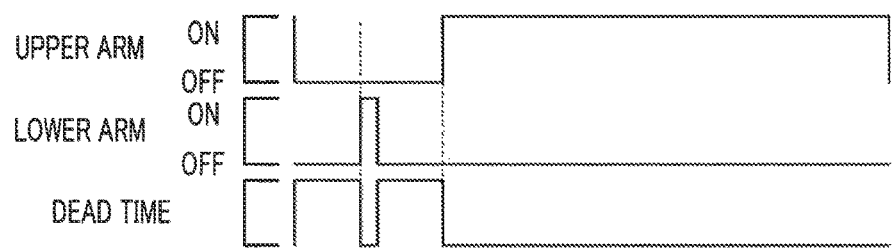

FIG. 4 is an explanatory diagram that shows the statuses of the upper and lower arms in the case where the step-up converter 40 is placed in the non-step-up state, in the case where the non-step-up state is cancelled and in the case where the step-up converter 40 is placed in the step-up state. As shown in FIG. 4, when the step-up converter 40 is placed in the non-step-up state, the upper arm (transistor T21) is turned on and the lower arm (transistor T22) is turned off over the entire one period (a duty ratio of 100%). When the non-step-up state (the on state of the upper arm) of the step-up converter 40 is cancelled, the duty ratio is decreased from 100% within the range in which the off time of the upper arm does not exceed a dead time caused by the off state of the upper arm. The duty ratio within the range in which the off time of the upper arm does not exceed the dead time is a dead band in which a step-up operation cannot be performed since the lower arm is not turned on. When the step-up converter 50 is placed in the step-up state, the duty ratio is further reduced such that the off time of the upper arm exceeds the dead time.

Figure 5:
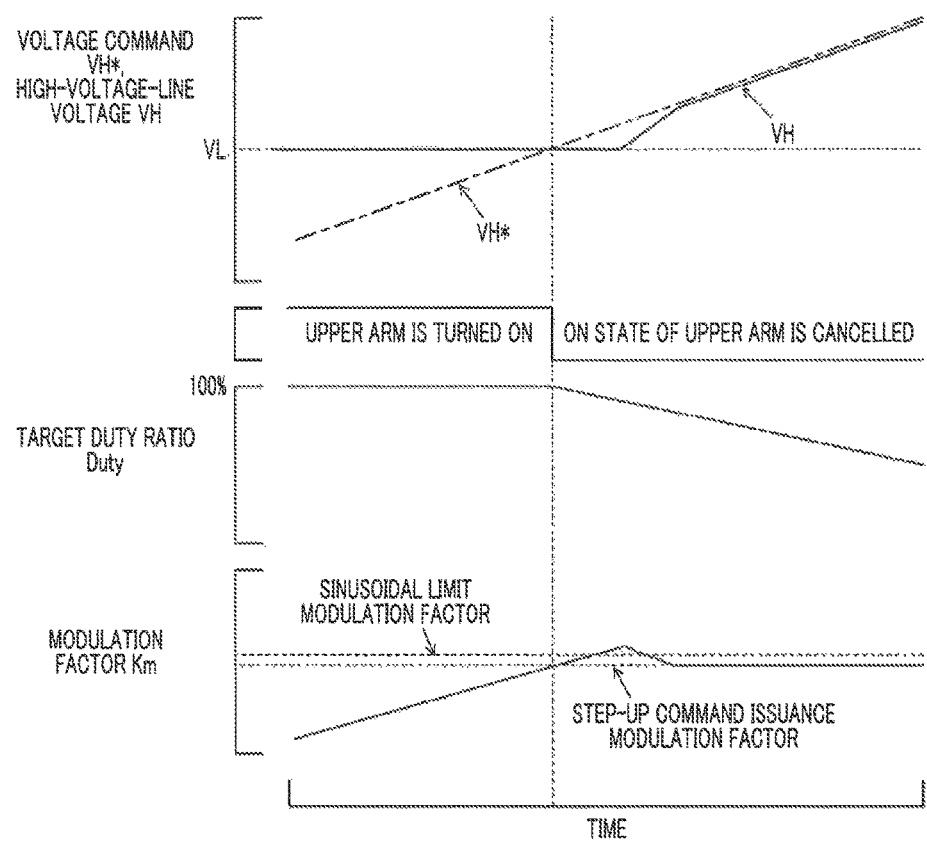
FIG. 5 is an explanatory diagram that shows changes in high-voltage-line voltage for a voltage command at the time when the on state of the upper arm of the step-up converter is cancelled at the timing at which the voltage command exceeds a battery-voltage-line voltage.
Figure 6:
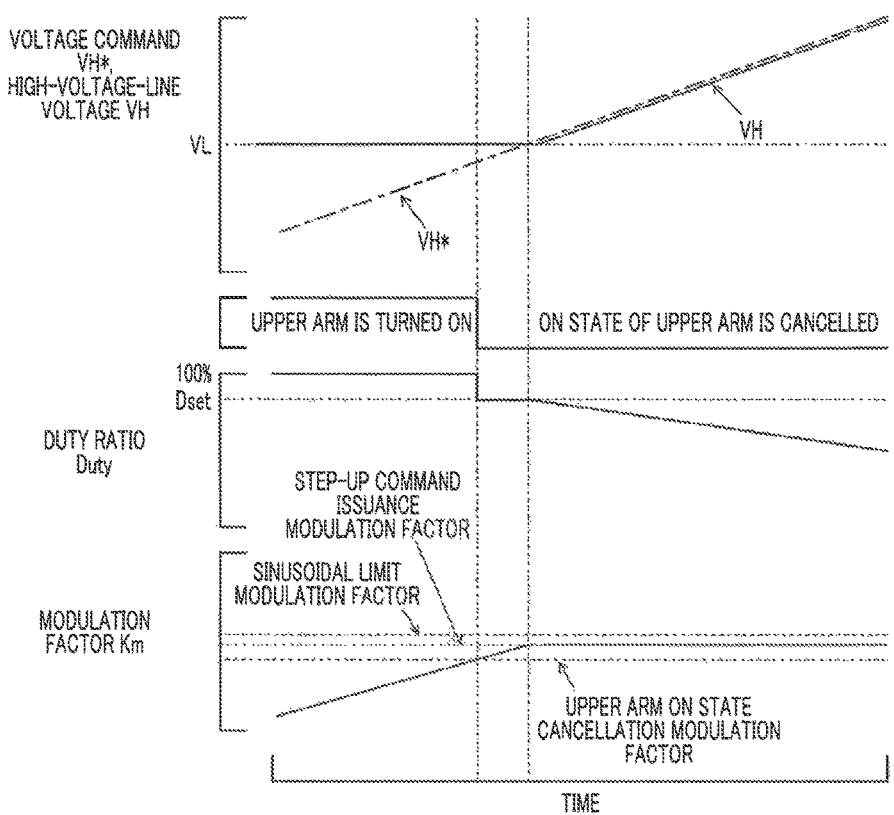
FIG. 6 is an explanatory diagram that shows changes in high-voltage-line voltage for a voltage command at the time when the on state of the upper arm of the step-up converter is cancelled at the timing just before the voltage command exceeds the battery-voltage-line voltage.

FIG. 5 is an explanatory diagram that shows changes in high-voltage-line voltage VH for the voltage command VH* at the time when the on state of the upper arm of the step-up converter 40 is cancelled at the timing at which the voltage command VH* exceeds the battery-voltage-line voltage VL. FIG. 6 is an explanatory diagram that shows changes in high-voltage-line voltage VH for the voltage command VH* at the time when the on state of the upper arm of the step-up converter 40 is cancelled at the timing just before the voltage command VH* exceeds the battery-voltage-line voltage VL. As described above, the step-up converter 40 ensures a dead time during which both the upper arm (transistor T21) and the lower arm (transistor T22) are turned off, so there is a dead band in which it is not possible to turn on the upper arm and turn off the lower arm in a region in which the duty ratio is close to 100%. For this reason, as shown in FIG. 5, even when the target duty ratio Duty is tried to be reduced from 100% at the timing at which the voltage command VH* exceeds the battery-voltage-line voltage VL (at the timing at which the modulation factor Km exceeds a step-up command issuance modulation factor), it is not possible to increase the high-voltage-line voltage VH while the dead band is being passed. At this time, when the inverter 34 is controlled in response to the target operating point (the torque command Tm*, the rotation speed Nm) of the motor 32, the modulation factor Km can significantly increase and can exceed the sinusoidal limit modulation factor (a value of 0.61 or a value of 0.7). In this case, although there is an allowance in step-up operation of the step-up converter 40, the control mode of the inverter 34 shifts from the sinusoidal wave PWM control mode to the overmodulation PWM control mode or the rectangular wave control mode as a result of an increase in the modulation factor Km, with the result that the controllability of the motor 32 deteriorates.

In contrast, in the present embodiment, as shown in FIG. 6, the target duty ratio Duty is reduced from 100% at the timing at which the voltage command VH* exceeds the upper arm on state cancellation voltage Vref lower than the battery-voltage-line voltage VL (at the timing at which the modulation factor Km exceeds an upper arm on state cancellation modulation factor lower than the step-up command issuance modulation factor), and the dead band is passed. Thus, it is possible to immediately start a step-up operation by further reducing the target duty ratio. Duty at the time when the voltage command VH* exceeds the battery-voltage-line voltage VL, so it is possible to cause the high-voltage-line voltage VH to quickly follow the voltage command VH*. When the voltage command VH* is lower than or equal to the battery-voltage-line voltage VL, the target duty ratio Duty is set such that the off time of the upper arm substantially coincides with the dead time. Therefore, the step-up converter 40 does not actually start a step-up operation, so it is possible to suppress an increase in the high-voltage-line voltage VH beyond the voltage command VH*.

With the above-described automobile 20 according to the present embodiment, when the voltage command VH* of the high-voltage power line 42 exceeds the upper arm on state cancellation voltage Vref lower than the battery-voltage-line voltage VL while the step-up converter 40 is being controlled in a state where the target duty ratio Duty that is the target value of the duty ratio of the on state of the upper arm (transistor T21) is set to 100% (the upper arm is turned on), the target duty ratio Duty is reduced from 100%. Thus, it is possible to cause the dead band of the duty ratio to be passed just before the voltage command VH* exceeds the battery-voltage-line voltage VL. Therefore, it is possible to immediately start a step-up operation by further reducing the target duty ratio Duty at the time when the voltage command VH* exceeds the battery-voltage-line voltage VL, so it is possible to cause the high-voltage-line voltage VH to quickly follow the voltage command VH*. As a result, it is possible to reduce a delay in response at the time when the step-up converter 40 is shifted from the non-step-up state to the step-up state, so it is possible to further improve the controllability of the motor 32.

With the automobile 20 according to the present embodiment, in the period from when the voltage command VH* exceeds the upper arm on state cancellation voltage Vref to when the voltage command VH* exceeds the battery-voltage-line voltage VL, the target duty ratio Duty is reduced from 100% within the range in which the off time of the upper arm (transistor T21) does not exceed the dead time. Therefore, it is possible to reduce a situation that the high-voltage-line voltage VH exceeds the voltage command VH*.

Furthermore, with the automobile 20 according to the present embodiment, the predetermined value α that is subtracted from the battery-voltage-line voltage VL at the time of setting the upper arm on state cancellation voltage Vref is set to a larger value as a variation per unit time in the voltage command VH* increases. Thus, it is possible to reduce the target duty ratio Duty from 100% more reliably at the timing just before the voltage command VH* exceeds the battery-voltage-line voltage VL, irrespective of a change in voltage command VH*.

In the embodiment, in the period from when the voltage command VH* exceeds the upper arm on state cancellation voltage Vref to when the voltage command VH* exceeds the battery-voltage-line voltage VL, the target duty ratio Duty is set such that the off time of the upper arm (transistor T21) substantially coincides with the dead time caused by the off state of the upper arm. The target duty ratio Duty just needs to be reduced from 100% within the range in which the off time of the upper arm does not exceed the dead time.

Figure 7:
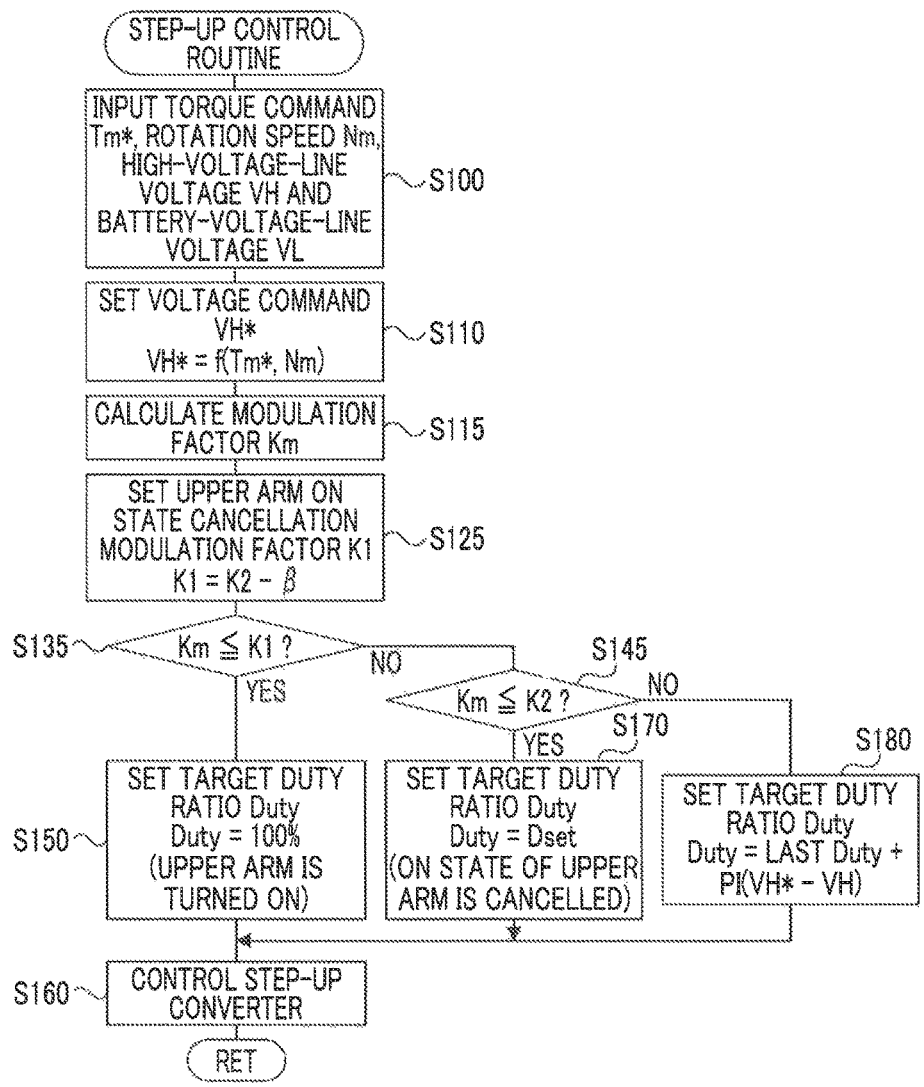
FIG. 7 is a flowchart that shows a step-up control routine according to an alternative embodiment.

In the embodiment, it is determined whether to cancel the on state of the upper arm of the step-up converter 40 on the basis of the voltage command VH* of the high-voltage power line 42. Instead, it is determined whether to cancel the on state of the upper arm on the basis of the modulation factor Km. FIG. 7 is a flowchart that shows a step-up control routine according to an alternative embodiment. Like step numbers denote the same processes of the step-up control routine shown in FIG. 7 as those of the step-up control routine shown in FIG. 4, and the overlap description is omitted. In the step-up control routine according to the alternative embodiment, after the voltage command VH* is set in step S110 the modulation factor Km is calculated (step S115), and an upper arm on state cancellation modulation factor K1 is set (step S125). Calculation of the modulation factor Km is described above. The upper arm on state cancellation modulation factor K1 as well as the upper arm on state cancellation voltage Vref is a threshold for cancelling the non-step-up state of the step-up converter 40. The upper arm on state cancellation modulation factor K1 is set to a value obtained by subtracting a predetermined value β from a step-up command issuance modulation factor K2 that is a modulation factor at which a step-up command is issued. In the alternative embodiment, the predetermined value β is set to a larger value as a variation per unit time in modulation factor Km increases. Of course, a constant value may be set for the predetermined value β. Then, it is determined whether the modulation factor Km is lower than or equal to the upper arm on state cancellation modulation factor K1 (step S135), and it is determined whether the modulation factor Km is lower than or equal to the step-up command issuance modulation factor K2 (step S145). When the modulation factor Km is lower than or equal to the upper arm on state cancellation modulation factor K1, the target duty ratio Duty is set to 100% (step S150). When the modulation factor Km is higher than the upper arm on state cancellation modulation factor K1 and is lower than or equal to the step-up command issuance modulation factor K2, the above-described predetermined duty ratio Dset is set for the target duty ratio Duty (step S170). When the modulation factor Km is higher than the step-up command issuance modulation factor K2, the target duty ratio Duty is set by using the above-described mathematical expression (1) (step S180).

In the alternative embodiment, in the period from when the modulation factor Km exceeds the upper arm on state cancellation modulation factor K1 to when the modulation factor Km exceeds the step-up command issuance modulation factor K2, the target duty ratio Duty is set such that the on time of the upper arm (transistor T21) substantially coincides with the dead time caused by the off state of the upper arm. The target duty ratio Duty just needs to be reduced from 100% within the range in which the on time of the upper arm does not exceed the dead time.

In the embodiment, the disclosure is implemented as an electric vehicle on which the drive system including the motor 32 as a power source for propelling the vehicle is mounted. However, the disclosure is not limited to this configuration. The disclosure may be applied to any automobile as long as a drive system including an electrical storage device, an electric motor, an inverter and a step-up converter is mounted. The disclosure may be applied to, for example, a hybrid vehicle on which a drive system including an engine and an electric motor is mounted or an automobile on which a drive system including an electric motor and a fuel cell that is able to supply electric power to the electric motor and an electrical storage device is mounted.

The correspondence relationship between the major components of the embodiment and the major components of the aspect of the disclosure in SUMMARY will be described. In the embodiment, the battery 36 corresponds to the "electrical storage device", the motor 32 corresponds to the "electric motor", the inverter 34 corresponds to the "inverter", the step-up converter 40 corresponds to the "step-up converter", and the electronic control unit 70 corresponds to the "controller".

The correspondence relationship between the major components of the embodiment and the major components of the aspect of the disclosure in SUMMARY does not limit the components of the aspect of the disclosure in SUMMARY since the embodiment is an example for specifically illustrating the aspect of the disclosure in SUMMARY. That is, the aspect of the disclosure in SUMMARY should be interpreted on the basis of the text in SUMMARY, and the embodiment is only a specific example of the aspect of the disclosure in SUMMARY.

The aspect of the disclosure is described with the use of the embodiment; however, the disclosure is not limited to the embodiment. Of course, the disclosure may be implemented in various modes without departing from the scope of the disclosure.

The disclosure is usable in manufacturing industries of drive systems.

What is claimed is:
1. A drive system comprising:
an electrical storage device;
an electric motor;
an inverter configured to drive the electric motor through voltage modulation;
a step-up converter including two switching elements and a reactor, the step-up converter being configured to adjust a voltage at a side of the inverter to a voltage higher than or equal to a voltage at a side of the electrical storage device; and
a controller configured to:
maintain the step-up converter in a non-step-up state while the step-up converter is being controlled in a state where a duty ratio of an on state of an upper arm that is any one of the two switching elements is set to 100%, and
reduce the duty ratio of the on state of the upper arm from 100% when a modulation factor of the inverter in voltage modulation exceeds a predetermined modulation factor lower than a step-up command issuance modulation factor at which a step-up command is issued to the step-up converter or when a target voltage at the side of the inverter based on a target operating point of the electric motor exceeds a predetermined voltage lower than the voltage at the side of the electrical storage device.

2. The drive system according to claim 1, wherein the controller is configured to, when the modulation factor exceeds the predetermined modulation factor or when the target voltage at the side of the inverter exceeds the predetermined voltage, reduce the duty ratio of the on state of the upper arm from 100% within a range in which an off time of the upper arm is less than or equal to a dead time caused by an off state of the upper arm.

3. The drive system according to claim 2, wherein the controller is configured to, when the modulation factor exceeds the step-up command issuance modulation factor or when the target voltage at the side of the inverter exceeds the voltage at the side of the electrical storage device, further reduce the duty ratio of the on state of the upper arm.

4. The drive system according to claim 1, wherein the controller is configured to change the predetermined modulation factor in response to a state of change in the modulation factor.

5. The drive system according to claim 1, wherein the controller is configured to change the predetermined voltage in response to a state of change in the target voltage.

6. A control method for a drive system, the drive system including an electrical storage device, an electric motor, an inverter and a step-up converter, the inverter being configured to drive the electric motor through voltage modulation, the step-up converter including two switching elements and a reactor, the step-up converter being configured to adjust a voltage at a side of the inverter to a voltage higher than or equal to a voltage at a side of the electrical storage device, the control method comprising:
maintaining the step-up converter in a non-step-up state while the step-up converter is being controlled in a state where a duty ratio of an on state of an upper arm that is any one of the two switching elements is set to 100%, and
reducing the duty ratio of the on state of the upper arm from 100% when a modulation factor of the inverter in voltage modulation exceeds a predetermined modulation factor lower than a step-up command issuance modulation factor at which a step-up command is issued to the step-up converter or when a target voltage at the side of the inverter based on a target operating point of the electric motor exceeds a predetermined voltage lower than the voltage at the side of the electrical storage device.

7. The control method according to claim 6, wherein
when the modulation factor exceeds the predetermined modulation factor or when the target voltage at the side of the inverter exceeds the predetermined voltage, the duty ratio of the on state of the upper arm is reduced from 100% within a range in which an off time of the upper arm is less than or equal to a dead time caused by an off state of the upper arm.

8. The control method according to claim 7, wherein
when the modulation factor exceeds the step-up command issuance modulation factor or when the target voltage at the side of the inverter exceeds the voltage at the side of the electrical storage device, the duty ratio of the on state of the upper arm is further reduced.

9. The control method according to claim 6, wherein
the predetermined modulation factor is changed in response to a state of change in the modulation factor.

10. The control method according to claim 6, wherein
the predetermined voltage is changed in response to a state of change in the target voltage.

* * * * *